INVENTOR
EMIL PFENDER

INVENTOR
EMIL PFENDER

BY
Chilulm and Spencer
ATTORNEYS

United States Patent Office 3,695,840
Patented Oct. 3, 1972

3,695,840
METHOD OF PREPARING METAL OXIDES
WITH ARC GAS HEATERS
Emil Pfender, Minneapolis, Minn., assignor to PPG
Industries, Inc., Pittsburgh, Pa.
Filed May 4, 1970, Ser. No. 34,436
Int. Cl. C01g 23/04
U.S. Cl. 423—613
21 Claims

ABSTRACT OF THE DISCLOSURE

Metal oxides, such as titanium dioxide, are prepared by vapor phase oxidation of corresponding metal halides in a reaction space supplied with heat energy from a gas stream heated by electrical energy. Arc gas heaters having front and back electrodes are described. Magnetic field means about the front electrode are used for preventing elongation of the arc struck between the front and back electrode and preventing location of the arc foot on the external surface of the front electrode of the arc gas heater.

DESCRIPTION OF THE INVENTION

In the production of metal oxide, particularly pigmentary metal oxide, by vapor phase oxidation of at least one metal halide, the corresponding metal halide is reacted with an oxygenating gas, such as oxygen, oxygen-enriched air, air or other oxygen-containing gas, in a reaction zone maintained at temperatures at which the metal halide and oxygen react. When the reactants are, for example, titanium tetrachloride and oxygen, the temperature of the reaction is above 500° C. and typically is between 800° C. and 1600° C.

Although the reaction of metal halides with oxygen in the vapor phase is typically exothermic, it has been found in some cases that the heat of reaction is insufficient to preheat newly introduced reactants from normal ambient temperature to reaction temperature and to thus maintain the reaction on a continuous basis. The lack of efficient use of the heat of reaction has been attributed, in large part, to the removal of large quantities of usable heat by the metal oxide effluent product stream; heat lost by virtue of intensive radiation by the highly heated metal oxide product particles; and, by heat losses through the reactor walls. Consequently, it has been found necessary to continuously supply heat to the reaction zone in order to maintain the oxidation reaction on a continuous scale.

One method recently suggested for supplying heat to the aforesaid reaction zone is by the use of an arc gas heater. Arc gas heaters generally consist of a pair of spaced electrodes connected by a power source for establishing an arc therebetween. The gas to be heated, commonly known as the arc of work gas, is passed through the established arc whereupon an exchange of energy between the arc and the work gas occurs to raise the temperature and enthalpy of the work gas. The heated work gas is then forwarded to the reaction zone where it is mixed with reactants, e.g., metal halide and/or oxygen, and thereby supplies the necessary heat energy for initiating and/or sustaining the oxidation reaction referred to above. See, for Examples, U.S. Pats. 3,475,123 and 3,501,262.

The increase in energy of the work gas as a result of its passage through the arc gas heater is based not only on the thermal energy of the gas but also upon molecular dissociation and ionization, i.e., a certain percentage of the gas molecules will be dissociated and some atoms will be ionized by passage through the heating zone of the arc heater. Such dissociation and ionization requires energy input which does not increase the thermal energy of the gas, but becomes dissociation and ionization energy which is reflected in the enthalpy of the work gas. When the work gas is subsequently cooled and the molecules recombine, this energy is freed and is then added to the thermal energy of the gas stream.

The transfer of electrical energy into heat in the work gas results in the formation of a luminous, electrically conducting gaseous stream containing electrons, ions, molecules and/or atoms. Considering a gas volume large compared with a Debye-sphere, the over-all charge of the gas is neutral since the negative charges existing within the gaseous stream are balanced by an equal number of positive charges. A gas existing in this physical state is defined as a "plasma" or is said to be in the "plasma state."

Th characteristics of a plasma can vary broadly; however, there are two conventional types. One is a high pressure, high enthalpy type plasma, which is used, for example, to simulate the conditions encountered by a nose cone re-entering the earth's atmosphere. The other is a relatively low pressure, low enthalpy plasma, which is used to simulate conditions not as severe as the former plasma and which can be used to furnish heat for chemical synthesis reactions. High enthalpy plasmas typically operate with currents of over 1,000 amperes, whereas low enthalpy plasmas are typically generated with currents below 1,000 amperes, e.g., from 100 to 600 amperes, assuming that the same electrode configuration is employed. By reference to specific gases, low enthalpy oxygen plasmas have enthalpy values of from 500 to 2,000 B.t.u.'s per pound of oxygen, typically from 1,000 to 1,600 B.t.u.'s per pound of oxygen. Low enthalpy hydrogen plasmas have enthalpy values sixteen times that of oxygen values (hydrogen weighing $\frac{1}{16}$th that of oxygen), i.e., 8,000–32,000 B.t.u.'s per pound of hydrogen. Similar values for other gases can be calculated by utilizing the ratio of the molecular weight of the selected gas to oxygen.

It has now been observed that, when a low enthalpy plasma is generated with swift work gas flow rates, the aerodynamic drag force on the arc by the swiftly moving work gas causes the arc to be extended and eventually forced beyond the dimensions of the arc chamber where it terminates on a portion of the electrode not designed to accommodate the high energy flux associated with the region of arc attachment. The aforesaid condition of external attachment of the arc has been termed "peeking" and refers to the visual appearance of the arc at the exit of the nozzle electrode.

Peeking of the arc cannot be tolerated for the reason that operation of the arc heater under such conditions results in excessive wear and deterioration of the nozzle electrode, as well as erosion of adjacent pieces of equipment, e.g., insulation, separating O rings and metal parts. Potentially, the arc is capable of shorting out causing substantial damage to the arc heater, as well as the power supply that furnishes the power to operate the arc heater. In addition, if adjacent parts should be completely eroded, cooling water used to cool the arc heater electrodes will enter the system. In the production of metal oxides by vapor phase oxidation of the corresponding metal halide where halogen is a reaction product, many difficulties arise by the presence of water in the reactor system, e.g., severe corrosion due to the formation of hydrogen halides, plugging of conduit lines, etc. Such difficulties are particularly acute when chlorine and titanium tetrachloride are present in the reactor system.

The condition of peeking, described above, can be controlled by lowering the arc amperage and velocity of the work gas through the arc gas heater to the point where arc termination occurs within the arc chamber. However, that solution is not satisfactory from an economic and investment standpoint because it limits the capacity of the equipment below design capacity. Extending the length of the nozzle electrode is not entirely acceptable for the reason that even with an extension, peeking can still occur. Further, space limitations around the arc gas heater, as well as fabrication limitations, may prohibit such practice. Peeking can also be controlled by raising the arc amperage and lowering the work gas flow rate. However, this method also has several disadvantages. First, the increased amperage increases substantially the wear on the electrodes, thereby shortening their useful life. Secondly, the enthalpy of the work gas is substantially higher, thereby causing additional wear on the electrodes and appurtenant equipment. Thirdly, the design steady state conditions within the reactor are upset thereby altering product quality.

It has now been discovered that attachment of the arc external of the arc chamber can be restrained by providing magnetic field means that generate sufficient strength (magnetic flux) to restrain the length of the arc about the nozzle electrode to thereby cause termination of the arc within the arc chamber.

BRIEF DESCRIPTION OF THE DRAWINGS

The present invention can be more fully understood by reference to the accompanying drawings wherein.

DETAILED DESCRIPTION

Figure 1:
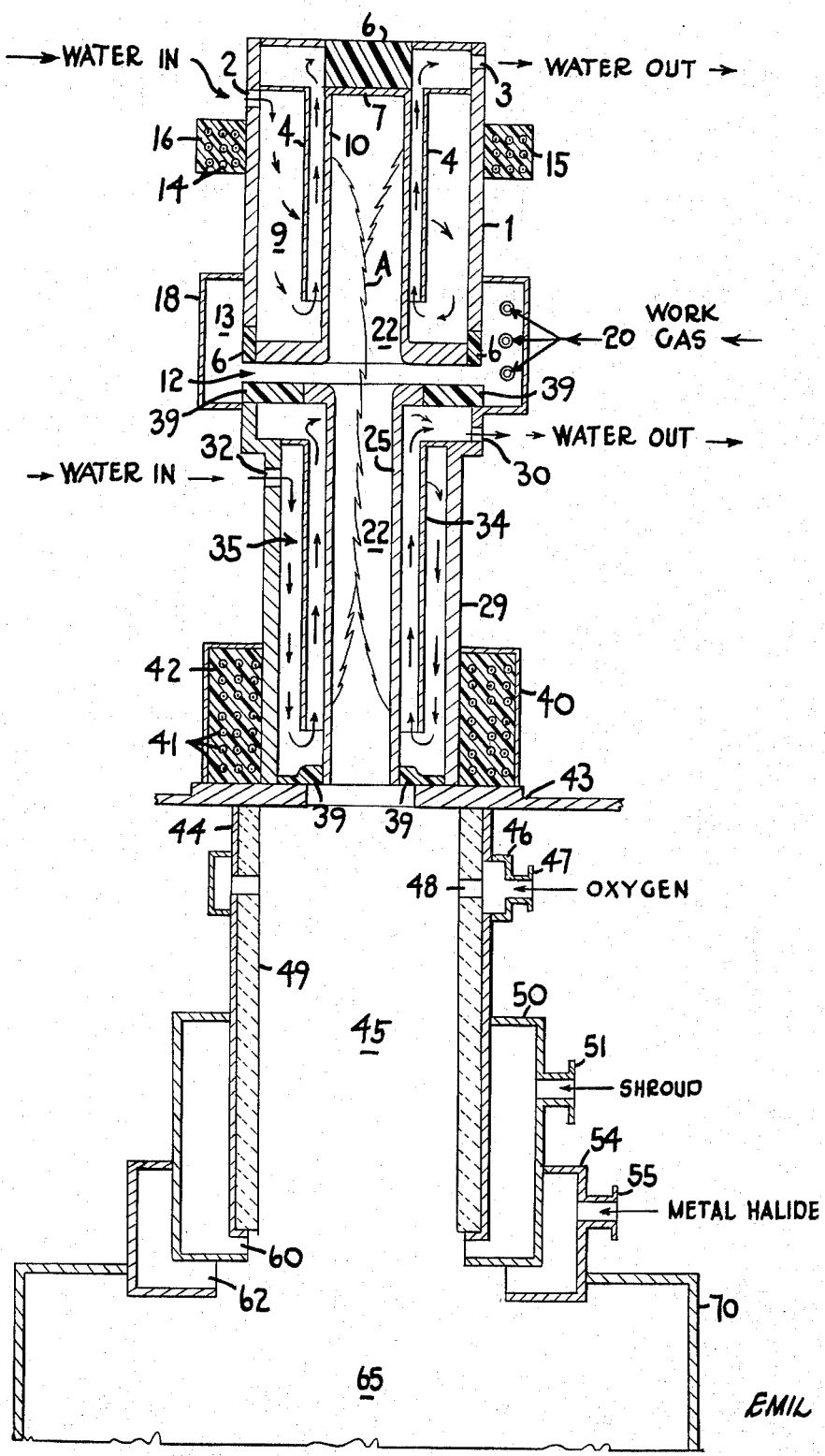
FIG. 1 is a cross-sectional schematic view of arc gas heater means mounted atop an assemblage of coaxial cylindrical conduit means for feeding reactant gases to a reactor employed for the production of metal oxide.

Referring now to the drawings and particularly FIG. 1, wherein a preferred embodiment of the present invention is depicted, the schematic of the apparatus shown comprises two spaced, substantially coaxial, hollow, cylindrical electrodes 10 and 25, across which an arc, A, is impressed upon the electrodes. Either electrode can be the cathode or anode, depending upon the polarity of the leads (not shown) from the power source (not shown). In a preferred embodiment, electrode 10 is the cathode, electrode 25 is the anode, direct current is used to power the arc gas heater, and the gaseous plasma produced by the arc heater exits therefrom from the forward section (nozzle end) of electrode 25. Electrode 10, as shown, has a larger internal diameter than electrode 25 and is closed at its back end by back plate 7.

Cup-shaped back electrode 10 is supported within and electrically insulated from cooling jacket means 1 spaced from said electrode 10 to form an annular chamber 9 therebetween. Thin-walled tube means 4 is provided within annular chamber 9 stopping short of the front end thereof to form a coolant flow path (illustrated by broken arrows) within chamber 9 and along the outside surface of electrode 10. Electrode 10 is electrically insulated from cooling jacket means 1 by suitable insulation designated 6. Although electrodes 10 and 25 are illustrated as being cylindrical and elongated, said electrodes can take other conventional shapes. The wall of cooling jacket means 1 is provided with coolant inlet means 2 and coolant outlet means 3. Both inlet and outlet means can be connected to suitable conduit means and coolant source (not shown) for the introduction of coolant, usually water, into and out of annular chamber 9. It should be understood that the direction of coolant flow could be reversed.

Surrounding back electrode 10 is field coil means 15 which generates a magnetic field to aid in stabilizing arc A and locating the arc foot (the point at which the arc terminates or sets down on the electrode surface) along the side wall of the electrode rather than have it localized at a spot on back plate 7. A further advantage of the field coil is to increase the current carrying capacity of the electrodes. Specifically, for a given electrode area there can be only so much current applied to that area before melting or severe arc erosion occurs. By using a field coil, the arc attachment will, in connection with the swirl flow of the work gas to be described hereinafter, rapidly rotate rather than remain concentrated in a localized area or spot. Thus, the effective arc attachment area will be increased so as to permit high over-all current with workable time-averaged current densities.

Typically, field coil 15 is composed of many turns of copper tubing or wire 14 imbedded in a ceramic-type material 16. The field coil can be cooled by any suitable means with water cooling being preferred and can be connected either in series to the power supply of the arc heater electrodes or it can have a separate power supply (usually direct current) of its own. The latter described embodiment is preferred. Electrical leads from the power source (not shown) to field coil 15 are not shown. Field coil 15 is disposed coaxially about back electrode 10 and extends along the longitudinal axis thereof a sufficient distance to provide a magnetic field with a component normal to the current flow of the arc in the vicinity of the electrode which is sufficient to encourage rapid rotation of the current (arc) and thereby spread the arc foot over a larger area than would be obtained without such magnetic field. The field coil can be stationary or rotating and can be designed to be moved along an axis parallel to the longitudinal axis of electrode 10.

Front electrode 25 is spaced from back electrode 10 formin gannular chamber 12 and arc chamber 22 (the volume defined by the internal dimensions of both electrodes). As shown, front electrode 25 is an elongated, cylindrical, hollow cylinder which is open at both ends. The end at which the work gas exits serves as a nozzle means. If desired, converging or diverging nozzle means can be connected to the frontal portion of electrode 25 to further direct the flow of gaseous plasma emanating from the arc gas heater. Electrode 25 is also surrounded by and electrically insulated from cooling jacket means 29 which contains coolant inlet and outlet means 32 and 30 respectively. Annular chamber 35, formed by electrode 25 and cooling jacket means 29, contains thin-walled tube 34 spaced from both electrode 25 and cooling jacket 29. This tube, like thin-walled tube 4, extends along the length of electrode 25 stopping short of the front end thereof to form a coolant flow path (also illustrated by broken arrows) within chamber 35 and along the outside surface of electrode 25. Conduit means (not shown) can be connected to coolant inlet means 32 and a source of coolant (not shown), as well as to coolant outlet means 30 and to a reservoir of coolant (not shown). Electrode 25 is electrically insulated from cooling jacket means 29 by suitable insulating means designated 39.

Cylindrical member 18 surrounds the lower portion of electrode 10 and the upper portion of electrode 25 to form internal chamber 13. Member means 18 is a hollow, cylindrical member having tangential gas inlet means 20 to permit work gas to be supplied to chamber 13. Although three inlets 20 are shown in FIG. 1, more or less can be used depending on the requirements of the arc gas heater. Typically, such inlets are designed to introduce work gas at sonic velocities in a manner so as to induce helical or vortex flow to the work gas.

In accordance with the present invention, magnetic field producing means, i.e., field coil 40, is provided at the front or gas exit end of nozzle electrode 25. Field coil 40 is typically composed of many turns of copper tubing or wire 41 imbedded in ceramic-type material 42. The field coil can be cooled by any suitable means with water cooling being preferred. Field coil 40 is operated by a suitable direct current power supply (not shown) and can be connected in series with the power supply of the arc heater electrodes or can have its own independent power source. Leads from the power source to field coil 40 are not shown. Field coil 40 can be stationary or rotatable and can also be designed to move along an axis parallel to the longitudinal axis of electrode 25.

Electrodes 10 and 25 are typically constructed of a pure metal or alloy of metals having a sufficiently high melting point and thermal conductivity to be useful as arc gas heater electrodes. Metals such as beryllium, chromium, cobalt, gold, manganese, nickel, platinum, silicon, silver, copper, titanium, tungsten, zirconium, tantalum and molybdenum can be employed, as well as alloys of such metals. Examples of alloys which can be employed are beryllium-copper, e.g., about 2 weight percent beryllium and about 98 weight percent copper, nickel-copper, silver-copper, chromium-nickel, chromium-vanadium, hafnium-zirconium, silver-gold, vanadium-tantalum, chromium-molybdenum, titanium-zirconium, as well as platinum-coated titanium.

A preferred metallic material is a silver or silver-copper alloy. Thus, a preferred material will contain from about 72 to 100 percent by weight silver and about 28 to 0 percent by weight copper. Preferred compositions of this alloy, i.e., 72 to 99 weight percent silver and 28 to 1 weight percent copper, include about 80 weight percent silver and 20 weight percent copper; 72 weight percent silver and 28 weight percent copper; and 90 weight percent silver and 10 weight percent copper. Such compositions are generally measured to within $\pm 1$ weight percent.

Referring again to FIG. 1, the gaseous plasma generating apparatus is mounted on flange 43 which, in turn, is attached to wall member 44 having reactant mixing means connected thereto. Reactant mixing means comprises tubular gas inlet means 46, 50 and 54 through which oxygen, shroud gas and metal halide are introduced into reactor 70. Wall member 44 has attached to it internally a ceramic or refractory material 49 capable of withstanding the temperatures and conditions created by the plasma gas emanating from the nozzle end of electrode 25 in passageway 45.

Surrounding wall member means 44, which is substantially coaxial with electrodes 10 and 25, are coaxial, cylindrical gas inlet tubular members 46, 50 and 54 having nozzles respectively 47, 51 and 55, through which reactant gas can be introduced into reactor 70. As shown in FIG. 1, oxygen is introduced from a source (not shown) into tubular member 46 by nozzle means 47. The oxygen then flows through opening 48 in wall member 44 and into passageway 45. The oxygen mixes with the hot plasma gas emanating from the plasma generator in chamber 45, which mixture because of its speed and velocity is projected longitudinally and directly into reactor 70 and the principal reaction zone which is generally designated as 65. As the hot oxygen-plasma gas mixture proceeds past annular openings 60 and 62, formed by the open ends of tubular members 50 and 54, it is surrounded by shroud gas and vaporous metal halide which emanate from annular openings 60 and 62 respectively. All of the gases admix within reactor 70 and react to form finely-divided metal oxide suspended in product gases. The metal oxide is recovered and further treated by conventional techniques.

The order of reactant introduction shown can be reversed, i.e., metal halide can be introduced into tubular member 46 and oxygen into tubular member 54; however, in that event, the work gas must be oxygen free to prevent any reaction from occurring within chamber 45 and thereby restrict the oxidation reaction to reaction chamber 70. In addition, if the work gas is oxygen or oxygen-containing gas, the oxygen introduced through chamber 46 can be eliminated or can be introduced to cool the temperature of the oxygen plasmas emanating from nozzle electrode 25.

Figure 2:
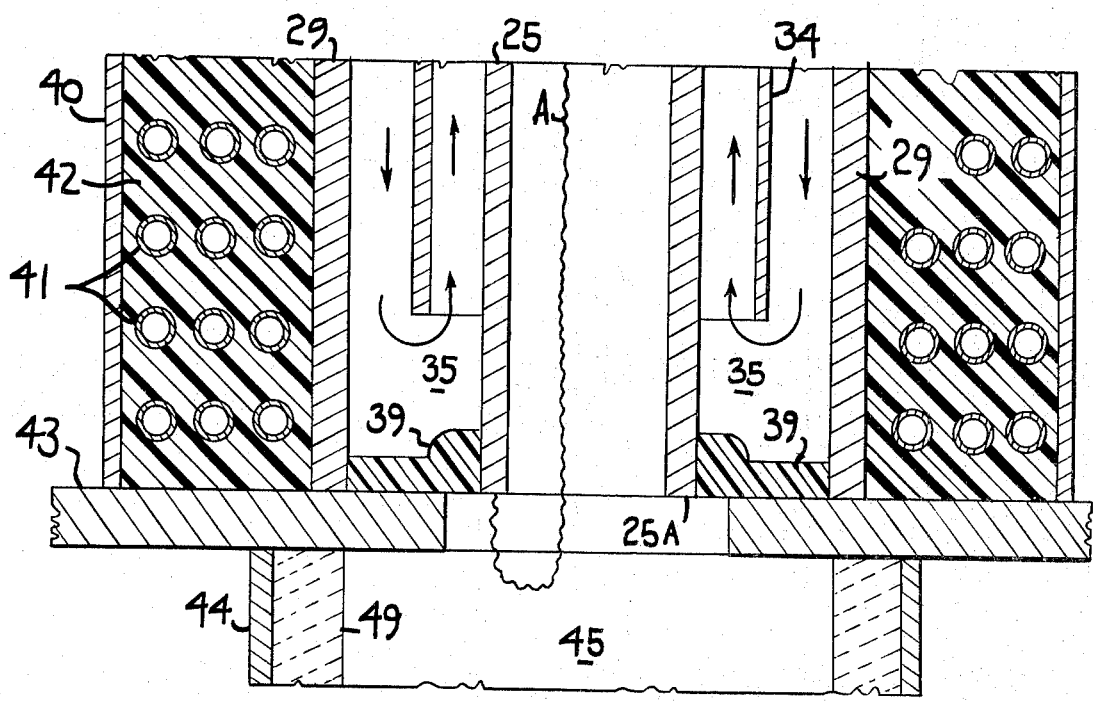
FIG. 2 is an enlarged schematic view of the nozzle end of the front electrode of arc gas heater means depicted in FIG. 1, which illustrates the condition of peeking.

Referring now to FIG. 2, wherein like numbers indicate like parts, there is shown, in schematic, an enlarged segment of the nozzle portion or mouth of front electrode 25 and the condition of peeking, i.e., extension of the arc beyond or outside the nozzle end of electrode 25 and subsequent termination or attachment of arc A on a surface other than an internal surface of electrode 25. FIG. 2 illustrates arc attachment on the exterior edge 25A of electrode 25. As used herein, the term "mouth" of front electrode 25 is intended to mean and include the exterior surfaces of the electrode, i.e., the nose or tip, as well as the internal area just within the nose of the electrode which is not directly in contact with electrode coolant and, therefore, inefficiently cooled. As can be seen from the drawing, the mouth of electrode 25 is not in as close contact to the coolant as other parts of the electrode. Thus, there is less effective heat removal from this portion of electrode 25 than from its internal surfaces where there is good contact with liquid coolant. Therefore, such exterior surfaces are subject to more severe erosion and pitting than the internal surfaces if subjected to the high energy fluxes associated with arc attachment. In addition, it can be seen from the drawing that it is also possible for external arc termination to erode and deteriorate insulation 39 or O rings (not shown) sealing chamber 35 from passageway 45 and the internal portion of reactor 70 (FIG. 1). Deterioration and then failure of insulation 39 would cause introduction of coolant, e.g., water, into the reactor system, and could cause the arc to short circuit. Both results would cause serious damage to the arc heater, its power supply and exposed reactor and product recovery components.

Figure 3:
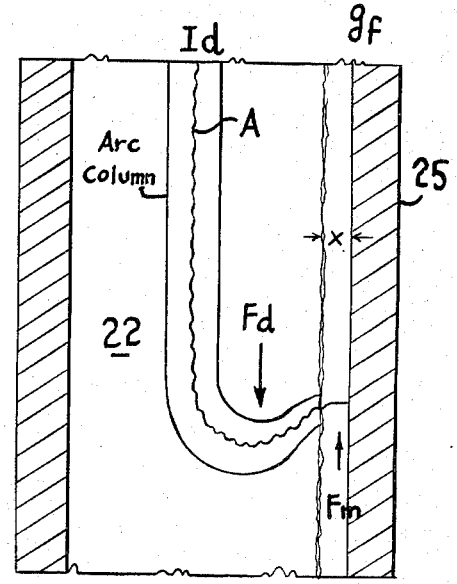
FIG. 3 is an enlarged schematic view of the frontal portion of the arc chamber depicted in FIG. 1 illustrating internal arc termination and some of the principal forces acting on said arc.

Referring now to FIG. 3, wherein like numbers indicate like parts, there is shown an enlargement of a section of front nozzle electrode 25 illustrating termination of the arc on an internal surface of the electrode and some of the principal forces acting upon said arc. In FIG. 3, there is shown an arc column, which is the partially ionized gas path along which the arc current flows; the current or current density, $I_d$; the aerodynamic drag force, $F_d$; and the self-imposed magnetic body force, $F_m$. There is also shown a gas film, $g_f$, along the inner wall of electrode 25, which typically has a thickness, $(x)$, of several millimeters or less. Gas film, $g_f$, is cooler than the gas in the arc column because it is adjacent to the cooled outside wall of electrode 25.

As shown in FIG. 3, the arc column is relatively constricted. This confinement of the arc column is mainly produced by the cold walls surrounding the arc. The cooler gas film adjacent to the internal electrode surface reduces ionization in areas close to it and, hence, the conductivity of the work bas in those areas is also lessened. Because of this lower degree of ionization, the current in the arc column tends to concentrate in the hotter central region of the arc column which is approximately along the longitudinal axis of the arc chamber 22. This increase in the current density by what is often termed a "thermal pinch effect" brings a further increase in the conductivity and temperature of the plasma along that axis. When the current density in the center of the arc column reaches extremely high values, a second pinch effect may take over. This is the magnetic pinch effect caused by the arc's self-induced magnetic field. This effect is in steady high pressure arcs usually of minor importance.

The arc column assumes a peculiar shape in the anode attachment region as indicated in FIG. 3. The gas dynamic drag force which drives the arc downstream is opposed by a magnetic body force due to the arc curvature in the cold gas film overlying the electrode surface. In the case of peeking, the arc attachment travels downstream under the influence of the gas dynamic drag force and reaches the exterior edge 25A of electrode 25 (FIG. 2). This condition, as pointed out hereinabove, is not a normal operating condition; is not one for which an arc gas heater is designed; and is, therefore, detrimental to arc stability, the arc heater apparatus, and all associated equipment.

There are two self-regulating mechanisms which are able to stop the arc before peeking occurs. These mechanisms will be briefly described because they facilitate an understanding of the invention. An increase of the arc curvature during the longitudinal travel may increase the magnetic body force sufficiently to overbalance the drag force and stop the movement. Unfortunately, this situation is restricted to certain parameter combinations (arc current and mass flow rate) and does not offer a reliable way to avoid peeking. The second mechanism embodies "restriking" of the arc. As the arc attachment travels downstream, the total length of the arc and the associated arc voltage increase. At the same rate as the total arc voltage increases, the gap voltage, $V_g$ between the arc column and the electrode surface at any location upstream of the arc attachment increases also. As soon as this voltage, $V_g$, surpasses the breakdown voltage, $V_b$ (the voltage which is required under the electrical conditions prevailing to produce a breakdown between the arc column and the electrode surface through the cold, almost non-conducting gas layer, $gf$, separating the arc column from the cold electrode surface) a new arc attachment is formed shorting the previous arc which decays rapidly. The new anode arc attachment moves again downstream until a new breakdown occurs. Since the described process of restriking is a statistical event, i.e., it depends on the prevailing local conditions which are never reproducible, this process cannot be considered as a reliable way to avoid peeking.

It has been found that the aforesaid condition, termed "peeking," can be corrected by establishing magnetic field means about the front nozzle electrode and, preferably, about the lower portion of said electrode. While not intending to be bound by any particular theory, it is believed that an additional circumferential vector is provided for the arc column by the magnetic field, i.e., the arc column rotates faster. This additional movement causes interaction of the arc column with surrounding gases, e.g., the colder gases exiting from the edge of the arc column to the electrode wall. Because of the increased energy exchange between the arc column and the colder gases, a substantial increase in arc voltage occurs which is sufficient to provide a condition where the gap voltage somewhat upstream of the arc attachment becomes equal to or greater than the required breakdown voltage at that particular location. That condition permitts the arc to break through the layer of relatively cold non-conductive gas along the wall of the electrode and provides attachment of the arc within an internal surface of the front electrode (restriking). The magnitude of this effect, which is related to the rotational velocity of the arc attachment, does provide the required reliability for normal operation of the arc gas heater, i.e., the undesirable effect of peeking can be eliminated. In sum, it is believed that the additional forces provided by the magnetic field about the front nozzle electrode restrains the arc from extending beyond the dimensions (outside the confines) of the nozzle electrode.

While methods are known by which the strength of a simple magnetic field can be calculated, it will be obvious in an apparatus of the character described in FIG. 1 that there are many interacting fields, the intensity of which varies with temperature, pressure, velocity of the work gas, as well as the geometry of the particular arc gas heater apparatus. It is, therefore, usually necessary to experiment to determine the magnetomotive force in ampere turns that is sufficient to restrain the arc from extending beyond the exit of the front electrode. The same is true of the magnetic field imposed upon the back electrode which helps provide the rotational movement required of the arc column within the internal surface of the back electrode. In the configuration shown in FIG. 1, the number of ampere turns required for field coils 15 and 40 will vary from about 40,000 to about 100,000. Typical power requirements will vary from 20 to 100 volts at 400 to 800 amperes. The number of field coil turns can vary from 100 to 1,000 turns.

Voltage and current requirements for electrodes 10 and 25 to provide a low enthalpy plasma can vary over a fairly wide range and generally increase with an increase in the rate of work gas flow. The exact voltage and current levels per volume of gas flow used is a function of the over-all configuration and design of the arc gas heater, i.e., they will vary with the particular mechanical and electrical design of commercial fabricators of arc heaters. In the configuration disclosed in FIG. 3, voltage requirements can range between about 250 and 2,500 volts or more, e.g., 3,000–4,500 volts; current requirements can range between about 20 and about 200 amperes or more, e.g., 250–600 amperes. Both voltage and current requirements will vary as the power demands change in accordance with the required enthalpy of the work gas, e.g., oxygen. Thus, the amount of heat imparted to the work gas is dependent upon the amount of heat required in the reaction zone to maintain the particular vapor phase oxidation. This latter quantity can be calculated from an over-all heat balance around the reactor. Generally, a power source furnishing high voltage and low current is preferred for providing power to the arc gas heater described herein; however, the reverse, i.e., low voltage-high amperage, or variations therebetween can be used.

In operating the apparatus of FIG. 1, work gas, e.g., oxygen, is introduced into swirl chamber 13 through inlets 20 at a high velocity, e.g., sonic velocity, tangentially to the inner wall of cylindrical member 18. The work gas flows as a swirling stream within chamber 13 and moves in a decreasing circular path and enters chamber 12 separating the electrodes. This swirling stream exits from chamber 12, the exit path leading upward in arc chamber 22 in a swirling motion along the inside circumference of electrode 10 which has a larger diameter than that of electrode 25. As the work gas stream reaches the blocked end of back electrode 10, it turns downward into a still smaller circular path. This smaller circular path is defined by the diameter and circumference of front electrode 25. Eventually, the work gas passes through and out of electrode 25, through passageway 45 and into reaction chamber 70 at sonic velocities. As the stream flows downwardly in arc chamber 22, it follows a swirling helical path.

Simultaneously with the passage of work gas through the arc gas heater, the power to electrodes 10 and 25 is turned on. The voltage drop across the arc gap between the electrodes, alone or in combination with other conventional arc initiation techniques described below, ionizes a portion of the work gas to create an ionized pathway along which an arc can travel. Initiation of the arc produces even a greater degree of ionization in the work gas thereby rendering the work gas conductive and permitting an electric current to flow between the electrodes.

Initiation of the arc can be accomplished by the use of high frequency starters, by evacuation of the heating zone to reduce the breakdown voltage, by movable carbon rods, strikers and by the use of a monoatomic gas, such as helium, argon or neon, such as described in U.S. Pat. 3,324,334 and applicant's copending application, Ser. No. 666,909, filed Sept. 11, 1967 now U.S. Patent 3,541,379.

The magnetic field produced by field coil 15 around back electrode 10 assists in stabilizing the upper end of the arc at electrode 10 and in combination with the helical flow of the work gas extends the life of electrode 10 by keeping the arc foot moving around the inside walls of the electrode.

Any suitable gas can be employed as the work gas. Typically, and in accordance with the present process, vaporous metal halide, e.g., titanium tetrachloride, oxygen-containing gas, e.g., oxygen, air, oxygen-enriched air, or an inert gas can be used. The term "inert gas," as employed in connection with the work gas, is intended to mean and include any gas which is chemically inert to the oxidation reaction of the metal halide at reaction conditions. Examples of suitable inert gases include the noble gases, such as argon, helium, krypton and xenon, nitrogen, chlorine, carbon dioxide, or mixtures thereof. Preferably, oxygen, air or oxygen-enriched air is used as the work gas.

Among the pigmentary metal oxides that can be produced from their corresponding halides, i.e., chlorides, fluorides, bromides and iodides, by the aforementioned process include the oxides of aluminum, arsenic, boron, iron, phosphorus, silicon, strontium, tin, titanium, zinc, zirconium, niobium, antimony, lead and mercury. When titanium dioxide is the metal oxide, a titanium halide such as titanium tetrachloride, titanium tetrabromide and titanium tetraiodide are advantageously used. Titanium tetrafluoride is not considered useful in the aforementioned vapor phase oxidation process and, accordingly, is not included herein the definition of titanium halide. Titanium tetrachloride is economically preferred.

The amount of oxygen supplied to the reactor will be in a stoichiometric amount so as to convert all of the metal halide introduced, e.g., titanium tetrachloride, to a metal oxide, e.g., titanium dioxide. Although greater or slightly less than stoichiometric quantities of oxygen can be employed, the amount of oxygen used will be generally from 0.9 to 2.5 times that of stoichiometric quantities. It is economically desirable that the amount of oxygen employed be not greater than 10 percent above the stoichiometric amount. It is likewise desirable that complete reaction of the metal halide be accomplished because of the difficulty of handling product metal oxide containing unreacted metal halide. Usually, the amount of oxygen introduced to the reactor ranges from 1.01 to 1.5 moles of oxygen for each mole of metal halide introduced to the reaction zone. More than stoichiometric quantities are provided to insure complete oxidation of the metal halide and other oxidizable components, e.g., metal halide additives, which are added to the reaction zone.

The velocity of the work gas introduced into the arc gas heater must be adequate to provide helical motion sufficient to aid in stabilization of the arc and to provide sufficient differential pressure at annuli 48, 60 and 62, to insure aspiration and proper mixing of reactants and shroud gas introduced through said annuli. Generally, velocities of a subsonic, sonic and supersonic nature can be used. Typically, velocities between 0.1 mach and the speed of sound (mach 1) are used. The term "mach" refers to the ratio of the linear gas velocity to the velocity of sound in the same gas for the given temperature and gas composition. When oxygen is used as the arc gas, linear inlet velocities at ambient temperature of from 150 to 400 feet per second are typical. Linear velocities of the heated oxygen, i.e., after passage through the arc heater assembly, can vary between 400 and about 1,300 feet per second. Typically, work gas velocities are sonic both entering and leaving the arc gas heater. Work gas inlet linear velocities can be initiated by passing the gas under pressure through suitable jet inlets. Line pressures at the inlet can vary between 25 p.s.i.a. and about 400 p.s.i.a.

Initial temperatures to which the work gas stream is heated as it passes through the arc heater will be a function of the over-all heat requirements of the system. Thus, where titanium tetrachloride is being reacted in the vapor phase to produce pigmentary titanium dioxide, sufficient enthalpy should be imparted to the work gas in order to establish and/or maintain the reaction by assisting in providing a temperature above 700° C., e.g., 700° C. to 1600° C., preferably from 900° C. to 1,200° C. in the reaction zone. Typically, the work gas passing through the arc heater assembly is heated to an initial temperature of between about 1,600° C. and about 30,000° C. and usually is heated to an average temperature of between about 1,900° C. and about 3,000° C.

If the work gas emanating from the arc gas heater is too hot, it can be adjusted by the addition of colder work gas. For example, in the configuration of FIG. 1, if oxygen is used as the work gas, oxygen can be introduced through inlet 48 in tubular member 46 to regulate the ultimate temperature of the gas delivered to the reactor. Depending upon the ultimate temperature desired, and the temperature of the heated work gas exiting from the arc heater assembly, calculatable quantities of cooler arc gas can be admixed with the heated stream so that the resulting mixture will have an average temperature in the range desired.

The shroud gas introduced through annulus 60 in tubular member 50 is typically chemically inert with respect to the reactants at reaction temperatures. Examples of such gases include: chlorine, nitrogen, carbon dioxide, recycled tail gases from the reaction (without metal oxide product), helium and argon. Typically, the amount of shroud gas fed to the reactor is in the order of from 0.01 to 200 mole percent, based on the amount of metal halide, e.g., titanium tetrahalide, introduced into the reaction zone. Preferably, inert gas is employed in amounts of between about 5 and 100 mole percent based on metal halide. The inert shroud gas usually will not have a velocity exceeding the heated arc gas stream but can have a velocity equivalent to it. However, better results are obtained when its velocity is less than 50 percent, e.g., 5 to 40 percent, of the velocity of the arc gas.

In the production of pigmentary metal oxide, such as titanium dioxide, it has been found beneficial to introduce certain additives to the reaction zone to improve the properties of the pigmentary titanium dioxide produced. For example, and in a manner known in the art, rutile-promoting salts, such as an aluminum or zirconium salt, e.g., aluminum chloride, is added to the reaction zone by means of the titanium tetrahalide stream of the intervening inert gas stream. The titanium dioxide product so produced is found to have an increased rutile content typically in excess of 98 percent and in most cases above 99 percent. The amount of rutile-promoting salt added typically varies in an amount of between about 0.5 and about 10 mole percent based on titanium tetrahalide reactant.

Similarly, as silicon halide, such as silicon tetrachloride, can also be incorporated into the reaction zone by admixture with, for example, the titanium tetrahalide stream or the inert gas stream. Typically, the silicon halide additives are employed in amounts of from about 0.001 to about 2.7 mole percent, preferably between about 0.01 and about 2 mole percent based on the moles of titanium tetrahalide added to the reaction zone.

Alkali metal and/or alkaline earth metal compounds, including soluble or insoluble organic and inorganic compounds, can also be introduced into the reaction zone. Potassium compounds have been found to give particularly beneficial results with regard to the type of pigment produced. Typically, usable salts include potassium chloride, potassium sulfate, potassium nitrate, potassium acetate, phenyl potassium or mixtures thereof.

The present process is more particularly described in the following examples which are intended as illustrative only since numerous modifications and variations thereof will be apparent to those skilled in the art.

EXAMPLE I

Apparatus substantially similar to FIG. 1, except for the front nozzle electrode field coil 40, was used in the present example. Electrode 10 acted as the cathode and electrode 25 acted as the anode. Electrode 25 was grounded. The power furnished to the electrodes was 495 kilowatts. Oxygen at about 20° C. was introduced into chamber 13 through tangential inlets 20 at a rate of about 1,050 pounds per hour and at a calculated inlet velocity of mach 1.00. An arc was established and, under these conditions, the temperature of the oxygen exiting from nozzle electrode 25 was calculated to be about 4,460° F.; its velocity was calculated to be about 3,300 feet per second. The magnetomotive force (m.m.f.) of field coil 15 was 70 kiloampere turns. The heated oxygen exiting from electrode 25 was forwarded directly to reactor 70 through passageway 45; at the far terminus of which, titanium tetrachloride and chlorine shroud gas were aspirated into the hot oxygen stream from annuli 62 and 60. Titanium dioxide was formed in reactor 70 and was removed therefrom and subsequently recovered from the gaseous portion of the product effluent.

Thirty-nine (39) hours after start-up, a water leak was detected from the front anode water cooling jacket, resulting in an immediate shutdown of the process. Subsequent inspection of the arc heater revealed that the arc had been attaching to the very tip and exterior surfaces of electrode 25 as well as portions of the water jacket. It had destroyed the nose of the front electrode, the O rings separating the electrode from the cooling jacket and the end of the cooling jacket adjacent to the O rings. As a result, 80 gallons of water had leaked into the reactor system from cooling chamber 35.

EXAMPLE II

The conditions of Example I were repeated except that the front electrode field coil 40 was attached. The magnetomotive force of field coil 40 was 70 kiloampere turns. Visual inspection of the mouth of the arc heater, as well as physical inspection of the front electrode, revealed that arc attachment had taken place exclusively within the interior of electrode 25 and not on the mouth of the electrode.

EXAMPLE III

The conditions of Example I were repeated except that the field coil 40 of Example II was present, oxygen flow to the arc heater was about 1600 pounds per hour and power to the arc heater was 817 kilowatts. The temperature of the oxygen exiting from the front nozzle electrode 25 was calculated to be about 4,600° F. After at least about 144 hours of continuous operation, the front electrode was inspected. No evidence of peeking was found.

EXAMPLE IV

The conditions of Example III were repeated except that the oxygen flow was about 2600 pounds per hour and the power to the arc heater was about 1300 kilowatts. No evidence of peeking was found.

Examples I–IV demonstrate that impingement of the arc foot on the mouth of the nozzle electrode of an arc gas heater assembly can be restrained by application of a magnetic field of sufficient magnetomotive force about the front electrode.

While there are above described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

What is claimed is:

1. In the process of producing pigmentary metal oxide by vapor phase oxidation of the corresponding metal halide in a reaction zone wherein a stream of gas is heated by an arc gas heater having a back cathode electrode and a front nozzle anode electrode between which a plasma arc is established, and the heated gas is forwarded to said reaction zone wherein metal halide is converted to metal oxide, the improvement which comprises passing said stream of gas through said nozzle electrode at a velocity which would be sufficient to extend the length of the arc and thereby cause attachment of the arc at the mouth of said nozzle electrode and simultaneously establishing a magnetic field of sufficient strength about said nozzle electrode to restrain said arc extension and thereby cause termination of the arc within said nozzle electrode but above the mouth thereof.

2. In the process of producing pigmentary titanium dioxide by vapor phase oxidation of titanium halide in a reaction zone wherein a stream of gas selected from the group consisting of oxygen-containing gas and inert gas is heated by a low enthalpy arc gas heater having a back cathode electrode and a front nozzle anode electrode between which a plasma arc is established, and the heated gas is forwarded to said reaction zone where titanium halide vapor is contacted therewith and converted to titanium dioxide, the improvement which comprises passing said stream of gas through said nozzle electrode at a velocity which would be sufficient to extend the length of the arc beyond the dimensions of the nozzle electrode and thereby cause attachment of the arc at the mouth of said nozzle electrode and simultaneously establishing a magnetic field of sufficient strength about said nozzle electrode to restrain said arc extension and thereby cause termination of the arc within said nozzle electrode but above the mouth thereof.

3. In the process of producing pigmentary titanium dioxide by vapor phase oxidation of titanium tetrachloride in a reaction zone wherein a stream of oxygen is passed through the arc chamber of a low enthalpy arc gas heater having a cylindrical back cathode electrode spaced from and substantially coaxial to a cylindrical front nozzle anode electrode, the oxygen is heated by a plasma arc established across said back and front electrodes, and the heated oxygen is forwarded to said reaction zone where titanium tetrachloride vapor is mixed therewith and converted to titanium dioxide, the improvement which comprises passing said stream of oxygen through said front nozzle electrode at a velocity which would be sufficient to extend the length of the arc beyond the dimensions of the nozzle electrode and thereby cause attachment of the arc at the mouth of said nozzle electrode and simultaneously establishing a magnetic field of sufficient strength about said nozzle electrode to restrain arc attachment at the mouth of said nozzle electrode and thereby cause termination of the arc within but above the mouth of said nozzle electrode.

4. A process according to claim 1 wherein the metal oxide is titanium dioxide.

5. A process according to claim 4 wherein the metal halide is selected from the group consisting of titanium tetrachloride, titanium tetrabromide and titanium tetraiodide.

6. A process according to claim 1 wherein the stream of gas heated by the arc is selected from the group consisting of oxygen-containing gas and inert gas.

7. A process according to claim 1 wherein the front and back electrodes are spaced, substantially coaxial, cylindrical electrodes.

8. A process according to claim 1 wherein a magnetic field is impressed about the back electrode.

9. A process according to claim 1 wherein the arc gas heater is powered with current of less than 1,000 amperes.

10. A process according to claim 9 wherein the current ranges from 100 to 600 amperes.

11. A process according to claim 1 wherein the magnetic field is produced by a field coil.

12. A process according to claim 11 wherein the field coil has a magnetomotive force of from 40,000 to 100,000 ampere turns.

13. A process according to claim 2 wherein a magnetic field is established about the back electrode.

14. A process according to claim 2 wherein the arc gas heater is powered with current of from 100 to 600 amperes.

15. A process according to claim 2 wherein the stream of gas heated by the arc is oxygen.

16. A process according to claim 2 wherein the magnetic field has a magnetomotive force of from 40,000 to 100,000 ampere turns.

17. A process according to claim 3 wherein a magnetic field is established about the back electrode.

18. A process according to claim 3 wherein the arc gas heater is powered with current of from 100 to 600 amperes.

19. A process according to claim 3 wherein the magnetic field is produced by a field coil.

20. A process according to claim 19 wherein the magnetic field has a magnetomotive force of from 40,000 to 100,000 ampere turns.

21. A process according to claim 3 wherein the oxygen velocity through said front nozzle electrode is sonic velocity.

References Cited

UNITED STATES PATENTS 3,541,379   11/1970   Holden _____ 23—202 V X
3,481,703   12/1969   Zirngibl et al. _____ 23—202 V

OTHER REFERENCES

"The Plasma State" by E. J. Hellund, 1961, Ed., pp. 30 and 31, Reinhold Publishing Corp., N.Y.

EDWARD STERN, Primary Examiner

U.S. Cl. X.R.

423—659, 625, 618, 604, 606